US007639699B2

(12) United States Patent
Tallet et al.

(10) Patent No.: US 7,639,699 B2
(45) Date of Patent: Dec. 29, 2009

(54) TECHNIQUE FOR SHARING A PHYSICAL PORT AMONG A PLURALITY OF VIRTUAL BRIDGES ON A SWITCH IN A COMPUTER NETWORK

(75) Inventors: Francois Edouard Tallet, Santa Clara, CA (US); Munish Mehta, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 259 days.

(21) Appl. No.: 11/499,556

(22) Filed: Aug. 4, 2006

(65) Prior Publication Data

US 2008/0031266 A1 Feb. 7, 2008

(51) Int. Cl.
*H04L 12/28* (2006.01)
(52) U.S. Cl. ........................................ 370/401; 370/429
(58) Field of Classification Search ................ None
See application file for complete search history.

(56) References Cited

U.S. PATENT DOCUMENTS

| 5,394,402 | A | | 2/1995 | Ross |
| 5,473,599 | A | | 12/1995 | Li et al. |
| 5,742,604 | A | | 4/1998 | Edsall et al. |
| 5,764,636 | A | | 6/1998 | Edsall |
| 5,867,666 | A | | 2/1999 | Harvey |
| 5,963,556 | A | * | 10/1999 | Varghese et al. ............ 370/401 |
| 6,032,194 | A | | 2/2000 | Gai et al. |
| 6,188,694 | B1 | | 2/2001 | Fine et al. |
| 6,202,114 | B1 | | 3/2001 | Dutt et al. |
| 6,219,739 | B1 | | 4/2001 | Dutt et al. |
| 6,298,061 | B1 | | 10/2001 | Chin et al. |
| 6,304,575 | B1 | | 10/2001 | Carroll et al. |
| 6,330,599 | B1 | | 12/2001 | Harvey |
| 6,370,121 | B1 | | 4/2002 | Hausman |
| 6,515,969 | B1 | | 2/2003 | Smith |
| 6,795,403 | B1 | | 9/2004 | Gundavelli |
| 6,801,506 | B1 | | 10/2004 | Dey |
| 6,813,250 | B1 | | 11/2004 | Fine et al. |

(Continued)

OTHER PUBLICATIONS

U.S. Appl. No. 11/416,559, entitled System and Method for Running a Multiple Spanning Tree Protocol With a Very Large Number of Domains, by Khan, et al., filed May 3, 2006.

(Continued)

*Primary Examiner*—Jayanti K Patel
*Assistant Examiner*—Hooman Houshmand
(74) *Attorney, Agent, or Firm*—Cesari and McKenna, LLP

(57) ABSTRACT

A technique shares a port (e.g., a physical port) among a plurality of virtual bridges on a switch in a computer network. According to the novel technique, two or more virtual bridges are established on the switch, and are each assigned respective sets of Virtual Local Area Networks (VLANs). Each virtual bridge has a virtual interface corresponding to the physical port (a "shared trunk"), the virtual bridges regarding the virtual interfaces as though they were physical ports. Control messages transmitted by the virtual bridges on the virtual interfaces are sent over the physical port and to each other virtual interface of the port (the shared trunk), such as, e.g., by a virtual hub of the shared trunk. Also, control messages received on the physical port are sent over each virtual interface to each virtual bridge (e.g., by the virtual hub).

19 Claims, 6 Drawing Sheets

U.S. PATENT DOCUMENTS

| | | | |
|---|---|---|---|
| 6,898,189 B1 | 5/2005 | Di Benedetto et al. | |
| 6,937,576 B1 | 8/2005 | Di Benedetto et al. | |
| 6,970,902 B1 | 11/2005 | Moon | |
| 6,976,088 B1 | 12/2005 | Gai et al. | |
| 7,016,979 B2 * | 3/2006 | He et al. | 709/246 |
| 7,061,875 B1 | 6/2006 | Portolani et al. | |
| 2005/0063395 A1 | 3/2005 | Smith et al. | |
| 2007/0195794 A1 * | 8/2007 | Fujita et al. | 370/395.53 |
| 2008/0155562 A1 * | 6/2008 | Stenfort et al. | 719/318 |
| 2008/0240127 A1 * | 10/2008 | Cardona et al. | 370/401 |
| 2008/0310424 A1 * | 12/2008 | Peterson et al. | 370/395.53 |

OTHER PUBLICATIONS

IEEE Standard 802.1D-2004, IEEE Standard for Local and Metropolitan Area Networks-Media Access Control (MAC) Bridges, Jun. 9, 2004, pp. 1-269, New York, NY.

IEEE Standard P802.1Q-Rev/D5.0, IEEE Standard for Local and Metropolitan Area Networks-Virtual Bridged Local Area Networks-Revision, Sep. 12, 2005, pp. 1-300, New York, NY.

* cited by examiner

TECHNIQUE FOR SHARING A PHYSICAL PORT AMONG A PLURALITY OF VIRTUAL BRIDGES ON A SWITCH IN A COMPUTER NETWORK

BACKGROUND OF THE INVENTION

1. Field of the Invention

The present invention relates to computer networks and more particularly to sharing a physical port among a plurality of virtual bridges on a switch in a computer network.

2. Background Information

Many organizations, including businesses, governments and educational institutions, utilize computer networks so that employees and others may share and exchange information and/or resources. A computer network typically comprises a plurality of entities interconnected by means of one or more communications media. An entity may consist of any device, such as a computer, that "sources" (i.e., transmits) or "sinks" (i.e., receives) data frames over the communications media. A common type of computer network is a local area network ("LAN") which typically refers to a privately owned network within a single building or campus. LANs typically employ a data communication protocol (LAN standard), such as Ethernet, or a wireless protocol, that defines the functions performed by data link and physical layers of a communications architecture (i.e., a protocol stack).

One or more intermediate network devices are often used to couple LANs together and allow the corresponding entities to exchange information. For example, a bridge may be used to provide a "switching" function between two or more LANs or end stations. Typically, the bridge is a computer and includes a plurality of ports that are coupled via LANs either to other bridges, or to end stations such as routers or host computers. Ports used to couple bridges to each other are generally referred to as trunk ports, whereas ports used to couple bridges to end stations are generally referred to as access ports. The bridging function includes receiving data from a sending entity at a source port and transferring that data to at least one destination port for forwarding to one or more receiving entities. Notably, a bridge may also be referred to as a "switch," and both terms may be used interchangeably herein.

Spanning Tree Algorithm

Most computer networks include redundant communications paths so that a failure of any given link does not isolate any portion of the network. Such networks are typically referred to as meshed or partially meshed networks. The existence of redundant links, however, may cause the formation of circuitous paths or "loops" within the network. Loops are highly undesirable because data frames may traverse the loops indefinitely.

Furthermore, some devices, such as bridges or switches, replicate frames whose destination is not known resulting in a proliferation of data frames along loops. The resulting traffic can overwhelm the network. Other intermediate devices, such as routers, that operate at higher layers within the protocol stack, such as the Internetwork Layer of the Transmission Control Protocol/Internet Protocol ("TCP/IP") reference model, deliver data frames and learn the addresses of entities on the network differently than most bridges or switches, such that routers are generally not susceptible to sustained looping problems.

To avoid the formation of loops, most bridges and switches execute a spanning tree protocol which allows them to calculate an active network topology that is loop-free (i.e., a tree) and yet connects every pair of LANs within the network (i.e., the tree is spanning). The IEEE promulgated a standard (presently IEEE Std. 802.1D-2004) that defines a spanning tree protocol to be executed by 802.1D compatible devices. In general, by executing the 802.1D spanning tree protocol, bridges elect a single bridge within the bridged network to be the "Root Bridge." The 802.1D standard takes advantage of the fact that each bridge has a unique numerical identifier (bridge ID) by specifying that the Root Bridge is the bridge with the lowest bridge ID. In addition, for each LAN coupled to any bridge, exactly one port (the "Designated Port") on one bridge (the "Designated Bridge") is elected. The Designated Bridge is typically the one closest to the Root Bridge. All ports on the Root Bridge are Designated Ports, and the Root Bridge is the Designated Bridge on all the LANs to which it has ports.

Each non-Root Bridge also selects one port from among its non-Designated Ports (its "Root Port") which gives the lowest cost path to the Root Bridge. The Root Ports and Designated Ports are selected for inclusion in the active topology and are placed in a forwarding state so that data frames may be forwarded to and from these ports and thus onto the LANs interconnecting the bridges and end stations of the network. Ports not included within the active topology are placed in a blocking state. When a port is in the blocking state, data frames will not be forwarded to or received from the port. A network administrator may also exclude a port from the spanning tree by placing it in a disabled state.

To obtain the information necessary to run the spanning tree protocol, bridges exchange special messages called configuration bridge protocol data unit (BPDU) messages or simply BPDUs. BPDUs carry information, such as assumed root and lowest root path cost, used in computing the active topology. More specifically, upon start-up, each bridge initially assumes itself to be the Root Bridge and transmits BPDUs accordingly. Upon receipt of a BPDU from a neighboring device, its contents are examined and compared with similar information (e.g., assumed root and lowest root path cost) stored by the receiving bridge in memory. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDUs are not forwarded by bridges, the identifier of the Root Bridge is eventually propagated to and adopted by all bridges as described above, allowing them to select their Root Port and any Designated Port(s).

In order to adapt the active topology to changes and failures, the Root Bridge periodically (e.g., every hello time) transmits BPDUs. In response to receiving BPDUs on their Root Ports, bridges transmit their own BPDUs from their Designated Ports, if any. Thus, BPDUs are periodically propagated throughout the bridged network, confirming the active topology. As BPDU information is updated and/or timed-out and the active topology is re-calculated, ports may transition from the blocking state to the forwarding state and vice versa. That is, as a result of new BPDU information, a previously blocked port may learn that it should be in the forwarding state (e.g., it is now the Root Port or a Designated Port).

Virtual Local Area Networks

A computer network may also be segmented into a series of logical networks. For example, U.S. Pat. No. 5,394,402, issued Feb. 28, 1995 to Ross (the "'402 Patent"), discloses an arrangement for associating any port of a switch with any particular network segment. Specifically, according to the '402 Patent, any number of physical ports of a particular switch may be associated with any number of groups within the switch by using a virtual local area network (VLAN) arrangement that virtually associates the port with a particular VLAN designation. More specifically, the switch or hub associates VLAN designations with its ports and further associates those VLAN designations with messages transmitted from any of the ports to which the VLAN designation has been assigned.

The VLAN designation for each port is stored in a memory portion of the switch such that every time a message is received on a given access port the VLAN designation for that port is associated with the message. Association is accomplished by a flow processing element which looks up the VLAN designation in the memory portion based on the particular access port at which the message was received. In many cases, it may be desirable to interconnect a plurality of these switches in order to extend the VLAN associations of ports in the network. Those entities having the same VLAN designation function as if they are all part of the same LAN. VLAN-configured bridges are specifically configured to prevent message exchanges between parts of the network having different VLAN designations in order to preserve the boundaries of each VLAN. Nonetheless, intermediate network devices operating above L2, such as routers, can relay messages between different VLAN segments.

In addition to the '402 Patent, the IEEE promulgated the 802.1Q specification standard for Virtual Bridged Local Area Networks. To preserve VLAN associations of messages transported across trunks or links in VLAN-aware networks, both Ross and the IEEE Std. 802.1Q-2005 specification standard disclose appending a VLAN identifier (VID) field to the corresponding frames. In addition, U.S. Pat. No. 5,742,604 to Edsall et al. (the "'604 patent"), which is commonly owned with the present application, discloses an Interswitch Link (ISL) encapsulation mechanism for efficiently transporting packets or frames, including VLAN-modified frames, between switches while maintaining the VLAN association of the frames. In particular, an ISL link, which may utilize the Fast Ethernet standard, connects ISL interface circuitry disposed at each switch. The transmitting ISL circuitry encapsulates the frame being transported within an ISL header and ISL error detection information, while the ISL receiving circuitry strips off this information and recovers the original frame.

Notably, the IEEE Std. 802.1Q-2005 supports the creation of up to 4K, i.e., 4096, different VLANs or "broadcast domains" within a given network, and, notably, allows up to 4K VLANs to operate on each link. However, in some network designs, it is desirable to create more than 4K broadcast domains. For example, very large Metropolitan Area Networks (MANs) (e.g., or a service provider's Metro Ethernet services) can be created using L2 technology. These very large MANs may be used to provide communication services to hundreds or thousands of different customers. To keep the traffic from different customers separated, the MAN needs to establish more than 4K broadcast domains. The creation of large numbers of broadcast domains, however, may pose problems for the operation of the Multiple Spanning Tree Protocol, described below. Accordingly, a system that can utilize the Multiple Spanning Tree Protocol, and can also support a very large number of broadcast domains is described in commonly-owned copending U.S. patent application Ser. No. 11/416,559, entitled SYSTEM AND METHOD FOR RUNNING A MULTIPLE SPANNING TREE PROTOCOL WITH A VERY LARGE NUMBER OF DOMAINS, filed on May 3, 2006 by Khan et al., the contents of which are hereby incorporated by reference in their entirety. As discussed in detail therein, bridge domains (BDs) may be used to define a broadcast domain that is similar to a VLAN. By switching/bridging based on the bridge domains (e.g., up to 16K BDs), the limitation of 4K VLANs may be overcome. Other techniques may be available to overcome the 4K VLAN limitation, as will be understood by those skilled in the art, and the bridge domains are merely one representative example.

Multiple Spanning Tree Protocol

Within the IEEE Std. 802.1Q-2005, the IEEE also included a specification standard for a Spanning Tree Protocol that is specifically designed for use with networks that support VLANs. The Multiple Spanning Tree (MST) Protocol (MSTP), which is described in the IEEE Std. 802.1Q-2005, organizes a bridged network into regions. Within each region, MSTP establishes an Internal Spanning Tree (IST) which provides connectivity to all bridges within the respective region and to the ISTs established within other regions. The IST established within each MSTP Region also provides connectivity to the one Common Spanning Tree (CST) established outside of the MSTP regions by IEEE Std. 802.1Q-2005 compatible bridges running STP or RSTP. The IST of a given MST Region receives and sends BPDUs to the CST. Accordingly, all bridges of the bridged network are connected by a single Common and Internal Spanning Tree (CIST). From the point of view of the legacy or IEEE Std. 802.1Q-2005 bridges, moreover, each MST Region appears as a single virtual bridge on the CST.

Within each MST Region, the MSTP compatible bridges establish a plurality of active topologies, each of which is called a Multiple Spanning Tree Instance (MSTI). The MSTP bridges also assign or map each VLAN to one and only one of the MSTIs. Because VLANs may be assigned to different MSTIs, frames associated with different VLANs can take different paths through an MSTP Region. The bridges may, but typically do not, compute a separate topology for every single VLAN, thereby conserving processor and memory resources. Each MSTI is basically a simple RSTP instance that exists only inside the respective Region, and the MSTIs do not interact outside of the Region.

MSTP, like the other spanning tree protocols, uses BPDUs to establish the ISTs and MSTIs as well as to define the boundaries of the different MSTP Regions. The bridges do not send separate BPDUs for each MSTI. Instead, every MSTP BPDU carries the information needed to compute the active topology for all of the MSTIs defined within the respective Region. Each MSTI, moreover, has a corresponding Identifier (ID) and the MSTI IDs are encoded into the bridge IDs. That is, each bridge has a unique ID, as described above, and this ID is made up of a fixed portion and a settable portion. With MSTP, the settable portion of a bridge's ID is further organized to include both a settable priority component and a system ID extension. The system ID extension corresponds to the CIST or one of the MSTI IDs. The MSTP compatible bridges within a given Region will thus have a different bridge ID for the CIST and each MSTI. For a given MSTI, the bridge having the lowest bridge ID for that instance is elected the root. Thus, an MSTP compatible bridge may be the root for one MSTI but not another within a given MSTP Region.

Each bridge running MSTP also has a single MST Configuration Identifier (ID) that consists of three attributes: an alphanumeric configuration name, a revision level and a VLAN mapping table that associates each of the potential 4096 VLANs to a corresponding MSTI. Each bridge, moreover loads its MST Configuration ID into the BPDUs sourced by the bridge. Because bridges only need to know whether or not they are in the same MST Region, they do not propagate the actual VLAN-to-MSTI tables in their BPDUs. Instead, the MST BPDUs carry only a digest of the VLAN to MSTI table or mappings. The digest is generated by applying the well-known MD-5 algorithm to the VLAN to MSTI table. When a bridge receives an MST BPDU, it extracts the MST Configuration ID contained therein, including the digest, and compares it with its own MST Configuration ID to determine whether it is in the same MST Region as the bridge that sent the MST BPDU. If the two MST Configuration IDs are the same, then the two bridges are in the same MST Region. If, however, the two MST Configuration IDs have at least one non-matching attribute, i.e., either different configuration names, different revision levels and/or different computed digests, then the bridge that received the BPDU concludes that it is in a different MST Region than the bridge that sourced the BPDU. A port of an MST bridge, moreover, is considered to be at the boundary of an MST Region if the Designated Bridge is in a different MST Region or if the port receives legacy BPDUs.

Virtual Bridges

Spanning Tree Protocols (STPs) generally send a single control message (BPDU) for each physical port (link/interface). As such, the states of any configured VLANs of the network (e.g., up to 4K VLANs as in 802.1Q) all depend on the topology computed by the use of this single BPDU. In the case of STP and Rapid STP (RSTP), a single topology is computed in the whole network (the L2 domain), and all configured VLANs are implicitly mapped to this topology. In the MST Protocol (MSTP), however, several topologies may be computed, and the configured VLANs are explicitly mapped to a given topology (an MST instance). Because of this explicit mapping, MST Protocols must maintain a knowledge of the existence of all the configured VLANs (e.g., up to 4K), and it becomes relatively complex to support more and more VLANs in this manner (e.g., greater than 4K).

Virtual bridges offer a clean and simple solution to the existence of greater numbers of VLANs (e.g., greater than 4K) in a network, particularly for MST Protocol networks. In particular, a switch may be split into several instances of virtual bridges, where each virtual bridge operates (in the control plane) as though it were a separate physical switch/bridge. Accordingly, virtual bridges may be used to support more than 4K VLANs on a single switch, as each virtual bridge may separately support up to 4K VLANs.

FIGS. 1A and 1B are schematic block diagrams of virtual bridges not sharing a physical port in a data plane view and a control plane view, respectively. For instance, in FIG. 1A, a switch 102a may have two virtual bridges 103a and 103b, each assigned its own set of VLANs (e.g., 1a-4096a for virtual bridge 103a and 1b-4096b for virtual bridge 103b). Physical port/interface 110a interconnects the switch 102a (i.e., virtual bridge 103a) to a second switch 102b, which may be configured to support VLANs 1a-4096a. Physical port/interface 110b interconnects the switch 102a (i.e., virtual bridge 103b) to a third switch 102c, which may be configured to support VLANs 1b-4096b. In this manner, switch 102a is configured to support 8K VLANs (8192 VLANs), due to the separate virtual bridges 103a and 103b. In FIG. 1B, the control plane view may be seen, where each virtual bridge 103 appears as a separate switch/bridge within the network.

Notably, a virtual bridge may be configured with a plurality of attached physical ports. However, each physical port (or interface) of a switch is conventionally assigned (e.g., manually) to only a single virtual bridge. Specifically, this limitation currently prevents a switch from mixing VLANs (and bridge domains) belonging to different virtual bridges on the same port. There remains a need, therefore, for a technique that allows a physical port to be shared among a plurality of virtual bridges, particularly a technique that complies with current standards, e.g., as set forth in 802.1Q and 802.1D.

SUMMARY OF THE INVENTION

The present invention is directed to a technique for sharing a port (e.g., a physical port) among a plurality of virtual bridges on a switch in a computer network. According to the novel technique, two or more virtual bridges are established on the switch, and are each assigned respective sets of Virtual Local Area Networks (VLANs). Each virtual bridge has a virtual interface corresponding to the physical port (a "shared trunk"), the virtual bridges regarding the virtual interfaces as though they were physical ports. Control messages transmitted by the virtual bridges on the virtual interfaces are sent over the physical port and to each other virtual interface of the port (the shared trunk), such as, e.g., by a virtual hub of the shared trunk. Also, control messages received on the physical port are sent over each virtual interface to each virtual bridge (e.g., by the virtual hub).

In accordance with one aspect of the present invention, two or more virtual bridges that are to share a single physical port are established within a network switch, and VLANs are each assigned to one of the virtual bridges. Each virtual bridge represents the assigned VLANs on the shared physical port as a virtual interface of the virtual bridge, and each of the virtual interfaces is configured as a shared port (for the Spanning Tree Protocol, "STP"). Only VLANs associated with a particular virtual interface (i.e., a virtual bridge) are allowed on that particular virtual interface, and each virtual bridge controls the state of the VLANs on their respective virtual interface.

In accordance with another aspect of the present invention, a control protocol operating on a virtual bridge, illustratively the Multiple Spanning Tree (MST) protocol, sends a control message (e.g., a Bridge Protocol Data Unit, "BPDU") on its virtual interface. The control message is physically transmitted on the physical port, and replicated (e.g., reproduced and forwarded) to each other virtual interface (i.e., each other virtual bridge) associated with the shared trunk. Also, as control messages are received on the physical port, the control messages are replicated to each virtual interface (i.e., each virtual bridge) associated with the shared trunk. Illustratively, the replication may be performed by the virtual hub of the shared trunk.

Advantageously, the novel technique shares a physical port among a plurality of virtual bridges on a switch in a computer network. By configuring the virtual interfaces on the virtual bridges, the novel technique allows multiple virtual bridges to utilize a single physical port, particularly for use with the MST Protocol. In particular, the novel technique may be used with standard 802.1Q network configurations (i.e., non-proprietary configurations) because of the emulation of a "shared segment" by the novel shared trunk. Also, the novel technique is scalable to large computer networks, as the replication (e.g., software) may be necessary only for control messages, while data traffic may remain switched conventionally (e.g., hardware) over the physical port.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 2:
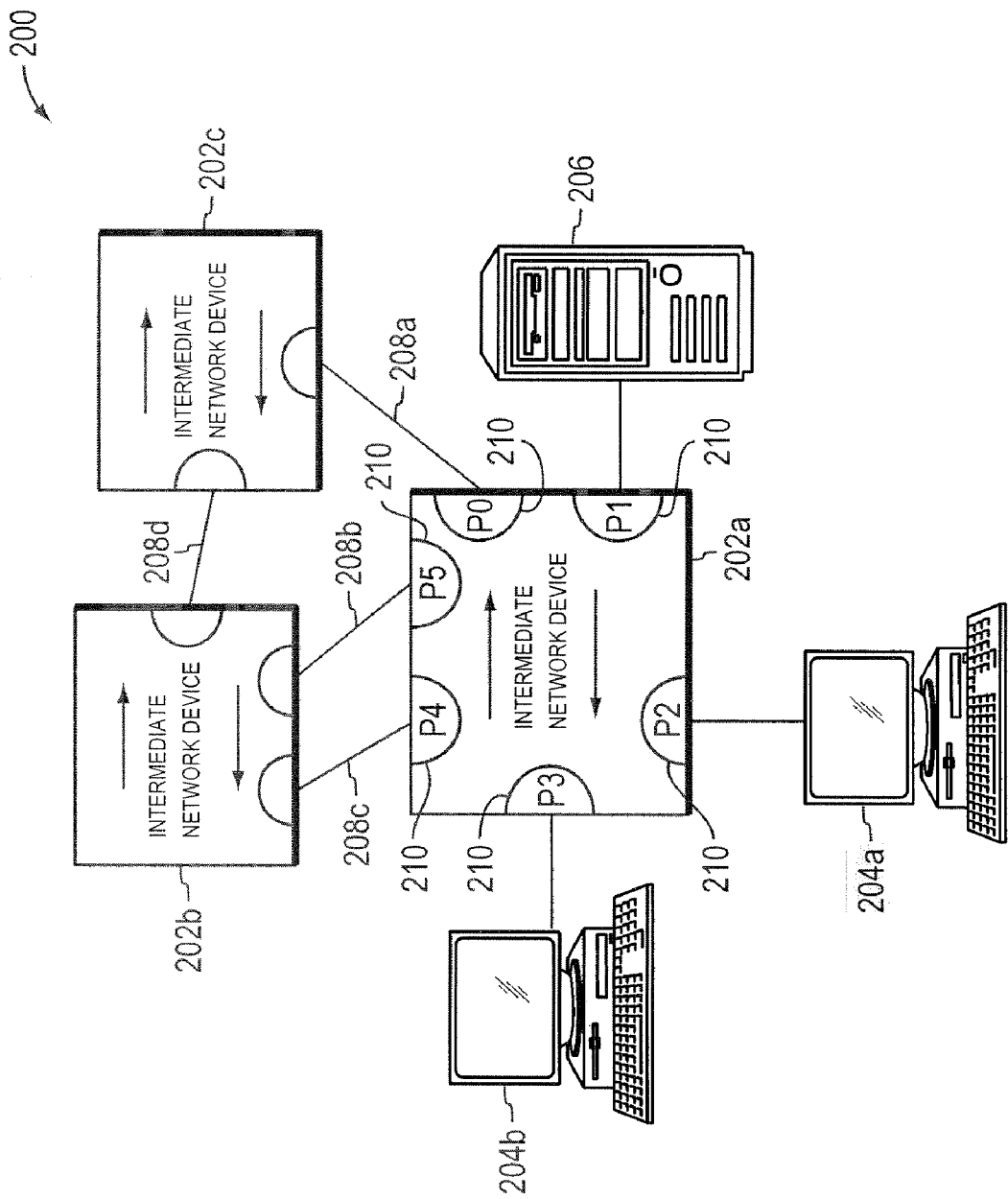
FIG. 2 is a highly schematic illustration of a bridged network in accordance with a preferred embodiment of the present invention.

FIG. 2 is a highly schematic block diagram of an illustrative computer network 200 in which the present invention may be advantageously employed. Network 200 includes a plurality of interconnected intermediate network devices 202a-c. Devices 202a-c are preferably switches/bridges. In the illustrative embodiment, switches 202a-c conform to IEEE Std. 802.1D-2004 and IEEE Std. 802.1Q-2005, which are hereby incorporated by reference in their entireties. Attached to the switches 202a-c are network entities, such as local area networks (LANs) and/or end stations. In particular, workstations 204a-b and server 206 are directly attached to bridge 202a. The switches 202a-c, moreover, are interconnected with each other by a plurality of links 208a-d, which may be shared media/segments or point-to-point links/segments.

Each switch 202 has a plurality of ports 210 for receiving and forwarding messages across the network 200. The ports of each switch 202, moreover, may be identified, e.g., by port numbers, such a Port 0 (P0), Port 1 (P1), Port 2 (P2), etc., so that the entities that can be reached by a respective switch can be associated with the particular port used to reach them. Switch ports that are coupled directly to end stations or LANs and to which no neighboring switch is coupled are referred to as "access ports" or UserNetwork Interface (UNI) ports. Switch ports 210 that connect to another intermediate network device, e.g., to a neighboring switch, are referred to as "trunk ports."

It should be understood that the network 200 of FIG. 2 is meant for illustrative purposes only, and that the present invention will operate with other networks having possibly far more complex topologies.

As shown, network 200 includes a loop. Execution of a spanning tree protocol, such as the Spanning Tree Protocol defined in IEEE Std. 802.1D-2004, prevents loops by defining a loop-free topology (i.e., an active topology) in the bridged network 200. It also allows the ports 210 that are part of the active topology to transition rapidly to a forwarding state so that network messages can be forwarded with minimal disruption and/or delay. Furthermore, execution of the Multiple Spanning Tree Protocol (MSTP), as defined in IEEE Std. 802.1Q-2005, establishes a plurality of active topologies, each associated with a Multiple Spanning Tree Instance. However, as set forth above, IEEE Std. 802.1Q-2005, including the MSTP, supports at most $2^{12}$ or 4K different VLANs (or broadcast/bridge domains). In some network situations, it is desirable to define more than 4K bridge domains, but still run a multiple spanning tree protocol. The present invention helps to achieve this objective.

Figure 3:
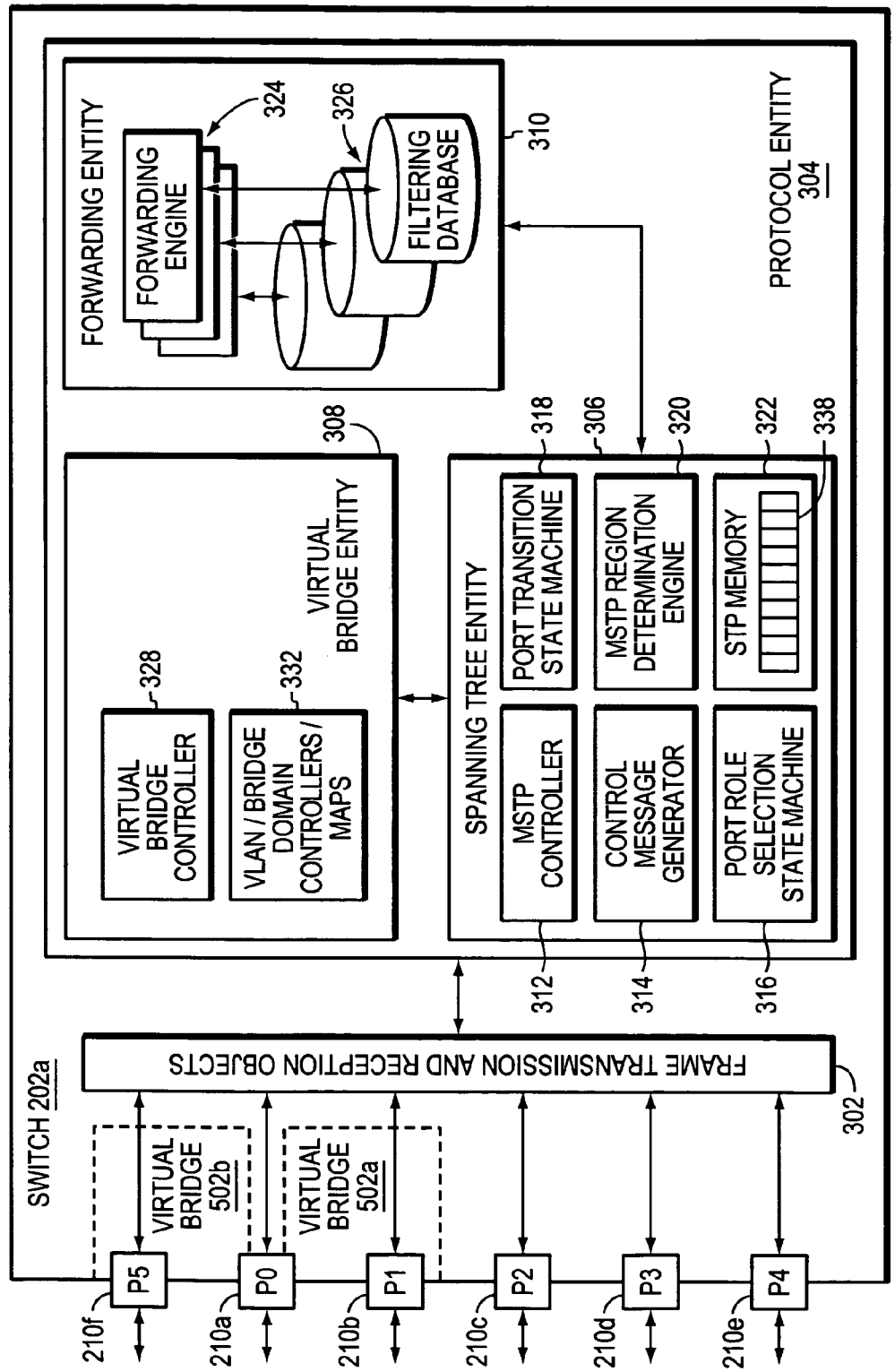
FIGS. 3 and 4 are partial block diagrams of an intermediate network device in accordance with a preferred embodiment of the present invention.

FIG. 3 is a partial, highly schematic block diagram of switch 202a. As indicated above, the switch has a plurality of ports 210a-f each of which is preferably identified by a number (e.g., P0-P5). Switch 202a further includes one or more frame transmission and reception objects, designated generally 302 that are associated with the ports 210a-f such that network messages, including data traffic and control messages/frames, received at a given port, e.g., P1, may be captured, and frames to be transmitted by switch 202b may be delivered to a given port, e.g., P2. Frame reception and transmission objects 302 are preferably message storage structures, such as priority queues.

Switch 202a further includes at least one protocol entity 304 that is in communicating relationship with the frame transmission and reception objects 302, and that comprises a plurality of components. In particular, the protocol entity 304 includes at least one spanning tree entity 306, a virtual bridge entity 308, and a forwarding entity 310. The spanning tree entity 306 preferably comprises a plurality of subcomponents, including a multiple spanning tree protocol (MSTP) controller 312, a control message generator 314, a port role selection state machine 316, a port transition state machine 318, an MSTP region determination engine 320, and a spanning tree protocol (STP) memory 322. Memory 322 is preferably organized to include a plurality of records or cells 338 for storing spanning tree related information or parameters, such as the bridge's numeric bridge identifier (ID), the assigned path cost for each port 210a-f, the current or "best" spanning tree information for each port P0-P5, etc. Memory 322 may be a volatile and/or non-volatile random access memory (RAM) or some other memory device.

The forwarding entity 310 includes one or more forwarding engines 324. Each forwarding engine 324 is preferably coupled to a corresponding filtering database 326 that stores address information corresponding to the entities of network 200 (FIG. 2). Each filtering database 326 preferably has a plurality of records (not shown) each containing a plurality of cells, including a destination address cell, a destination port cell and a corresponding timer cell. Each record in the filtering databases 326 preferably corresponds to a particular network entity.

The forwarding engines 324 are configured to switch or bridge messages, such as packets and/or frames, from a source port 210 to one or more destinations ports 210 depending on information contained in the appropriate forwarding database 326, and also depending on the spanning tree port states of the respective ports 210, as managed by spanning tree entity 306, and on the virtual LANs (VLANs) (and/or bridge domains) established at the ports. The forwarding entity 310 is in communicating relationship with the spanning tree entity 306, and may relay control messages, such as MSTP bridge protocol data unit (BPDU) control messages, received at ports 210 thereto.

The virtual bridge entity 308 also includes a plurality of subcomponents. In particular, the virtual bridge entity 308 preferably includes one or more virtual bridge controllers 328, and VLAN (and/or bridge domain) controllers 332. Virtual bridge controllers 328 may be used in accordance with the techniques described in accordance with the present invention, e.g., to control/manage virtual bridges 502 configured at the ports 210, and to act as a default virtual bridge to which all ports 210 may belong. Also, the VLAN controllers 332 may be used for, e.g., tagging messages to be sent from bridge 202a with a VLAN ID, and for examining the VLAN IDs of received messages, etc., as will be understood by those skilled in the art.

Those skilled in the relevant art will understand that the virtual bridge entity 308 may be disposed at other locations. For example, it may be distributed across the ports 210a-f (e.g., at each virtual bridge 502) or subsumed in the spanning tree entity 306. Those skilled in the relevant art will further understand that switch 202a and protocol entity 304 may include other entities and engines. The virtual bridge entity 308 may also be configured with additional subcomponents, not shown for clarity.

Figure 4:
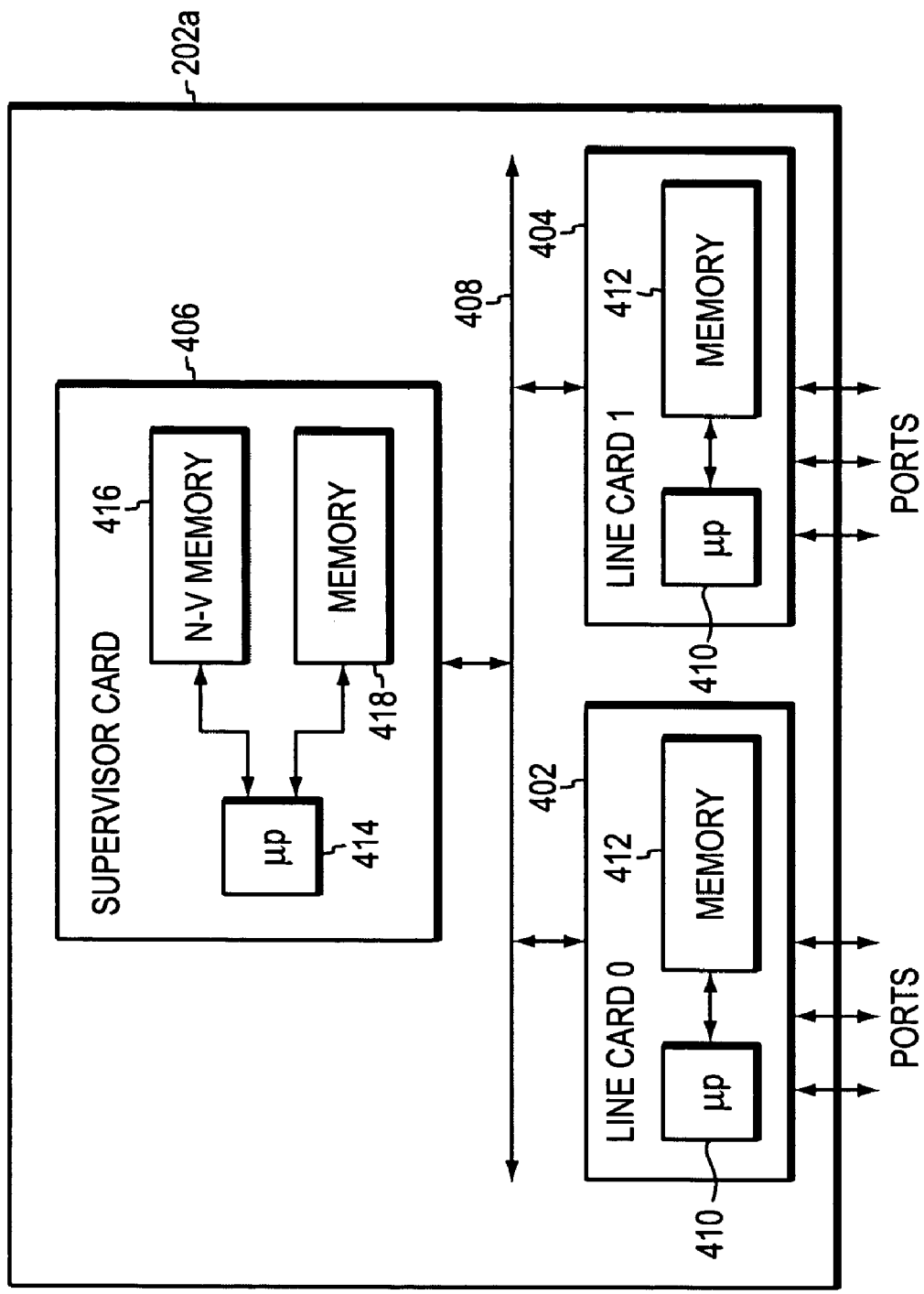

In the illustrated embodiment, switch 202a includes transmitting and receiving circuitry (e.g., hardware), including one or more line cards and/or network interface cards (NICs) establishing ports for the exchange of network messages, one or more supervisor cards having central processing units (CPUs) and/or microprocessors and associated memory devices for performing computations and storing the results therefrom and one or more bus structures. FIG. 4 is another highly schematic, partial block diagram of switch 202a illustrating such components. As shown in FIG. 4 switch 202a includes a plurality of line cards 402 and 404, and a supervisor card 406. Cards 402, 404, and 406 are in communicating relationship with each other through a communication bus 408. Each of the line cards 402 and 404 includes a microprocessor (µP) 410 and at least one memory 412. The supervisor card 406 also includes a µP 414, as well as both a non-volatile (N-V) memory 416 and a volatile memory 418, e.g., RAM.

Referring again to FIG. 3, it will be understood by those skilled in the art that the spanning tree entity 306, the virtual bridge entity 308, and the forwarding entity 310 may each comprise registers and combinational logic configured and arranged to produce sequential logic circuits. In the illustrated embodiment, the spanning tree entity 306, the virtual bridge entity 308, and the forwarding entity 310 are preferably software modules or libraries containing program instructions pertaining to the methods described herein and executable by one or more processing elements, such as the microprocessors 410 and/or 414 (FIG. 4), of switch 202a. Other computer readable media may also be used to store and execute these program instructions. Nonetheless, those skilled in the art will recognize that various combinations of software and hardware, including firmware, may be utilized to implement the present invention.

Suitable intermediate network device platforms for use with the present invention is include, but are not limited to, the commercially available series of switches from Cisco Systems, Inc. of San Jose, Calif., such as the Catalyst 6500, 7600, 3500, and GRS.

Figure 1B:
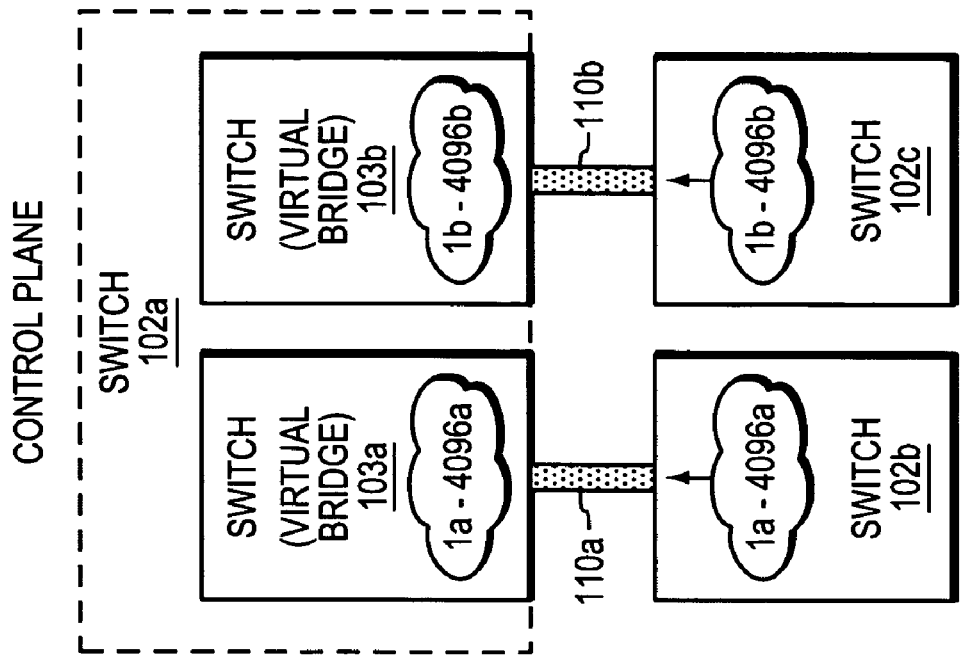
FIGS. 1A and 1B, previously discussed, are schematic block diagrams of virtual bridges not sharing a physical port in a data plane view and a control plane view, respectively.
Figure 1A:
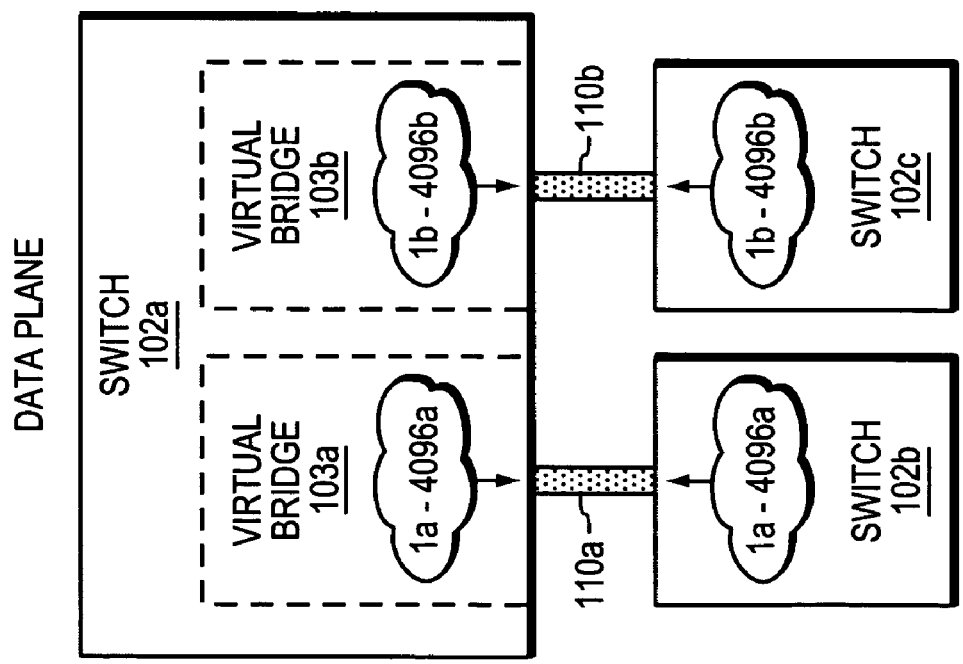

As mentioned above (e.g., with reference to FIG. 1 above), each physical port of a switch conventionally may be assigned only to one virtual bridge. Particularly, port-based control protocols, such as the MST protocol, generally only send one control message (e.g., a Bridge Protocol Data Unit, "BPDU") per port. This conventional limitation of a single port may be undesirable in certain situations, such as, e.g., where it would be advantageous to mix VLANs (or bridge domains) of different virtual bridges on a single physical port of the switch. For instance, as in FIG. 2, it may be beneficial to share Port "P0" among separate virtual bridges established on ports "P1" and "P5" (e.g., as also shown in FIG. 3).

The present invention is directed to a technique for sharing a port (e.g., a physical port) among a plurality of virtual bridges on a switch in a computer network. According to the novel technique, two or more virtual bridges are established on the switch, and are each assigned respective sets of VLANs. Each virtual bridge has a virtual interface corresponding to the physical port (a "shared trunk"), the virtual bridges regarding the virtual interfaces as though they were physical ports. Control messages transmitted by the virtual bridges on the virtual interfaces are sent over the physical port and to each other virtual interface of the port (the shared trunk), such as, e.g., by a virtual hub of the shared trunk. Also, control messages received on the physical port are sent over each virtual interface to each virtual bridge (e.g., by the virtual hub).

Figure 5B:
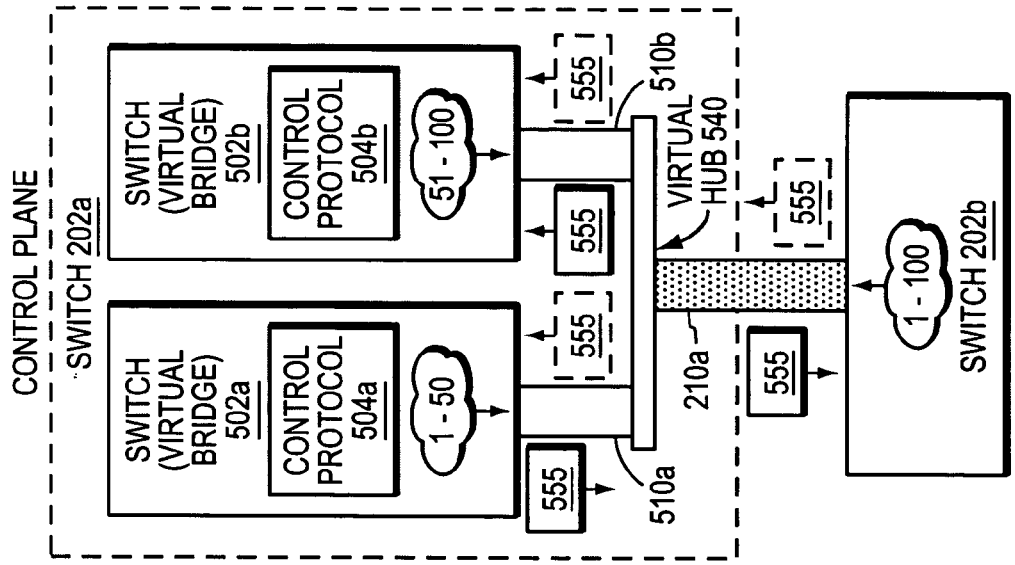
FIGS. 5A and 5B are schematic block diagrams of virtual bridges sharing a physical port in a data plane view and a control plane view, respectively, in accordance with the present invention.
Figure 5A:
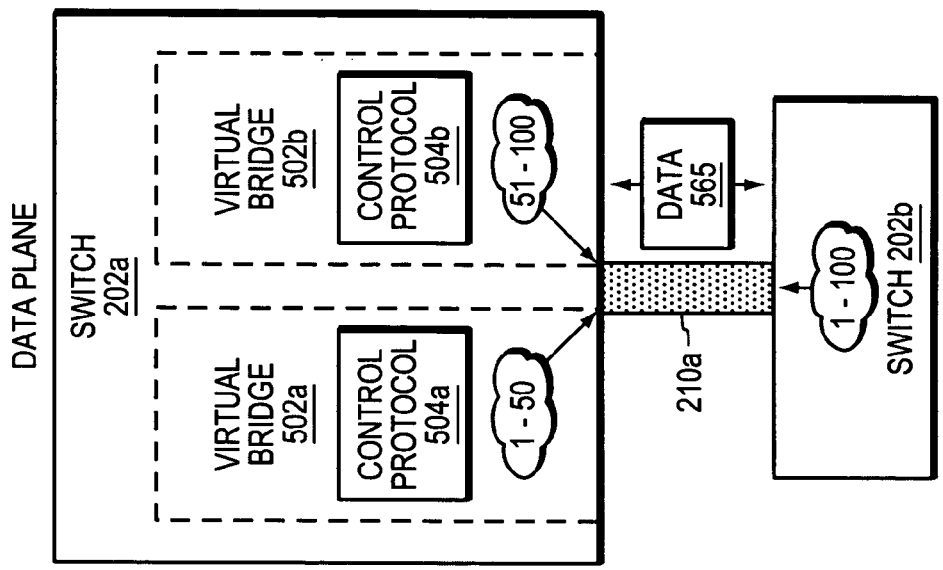

In accordance with one aspect of the present invention, two or more virtual bridges (e.g., 502a and 502b) that are to share a single physical port (e.g., P0/210a) are established within a network switch (e.g., 202a), and VLANs are each assigned to one of the virtual bridges. For instance, FIG. 5A is a schematic block diagram of virtual bridges sharing a physical port in a data plane view in accordance with the present invention. As shown in FIG. 5A, VLANs 1-50 may be assigned to virtual bridge 502a, and VLANs 51-100 may be assigned to virtual bridge 502b. Those skilled in the art will understand that other VLAN assignments may be made in accordance with the present invention, and that the VLAN assignments herein are merely examples chosen for clarity. Notably, in accordance with standards set forth in 802.1Q as described above, each physical port 210 of switch 202 may only support up to 4K (4096) total VLANs (e.g., if it is necessary/desired to comply with 802.1Q). Accordingly, the assigned VLANs to the two or more virtual bridges 502 may not exceed 4K total VLANs on the shared trunk, as the virtual bridges are sharing a single physical port 210a. Moreover, because a port is generally configured to carry a VLAN tag (as will be understood by those skilled in the art), the same VLAN (e.g., VLAN ID) can not exist in more than one virtual bridge on the shared trunk.

In accordance with the present invention, each virtual bridge 502 represents the assigned VLANs on the shared physical port 210a as a virtual interface of the virtual bridge. FIG. 5B is a schematic block diagram of virtual bridges sharing a physical port in a control plane view in accordance with the present invention. That is, each virtual bridge (e.g., 502a and 502b) configures a virtual interface (e.g., 510a and 510b, respectively) in place of the physical port 210a, and treats the virtual interface as though it were a physical port. Each of the virtual interfaces 510 may be configured as a "shared port," such that the STP (the control protocol, e.g., MSTP) of the virtual bridges treats the singly physical network port 210a as a shared segment/interface, in accordance with the present invention (e.g., described below). (Those skilled in the art will understand that the STP must be informed whether an interface is point-to-point or shared.)

Only VLANs associated with a particular virtual interface 510 (i.e., a virtual bridge 502) are allowed on that particular virtual interface, and all others are blocked. Accordingly, each virtual bridge 502 controls the state of the VLANs on their respective virtual interface 510. For instance, virtual bridge 502a (e.g., a control protocol instance running on the virtual bridge) may send control messages for VLANs 1-50, while virtual bridge 502b may send control messages for VLANs 51-100. Notably, while the present invention is described using VLANs, Bridge Domains (e.g., as described in above-incorporated U.S. patent application Ser. No. 11/416,559) may also be assigned to each virtual bridge 502, and used/controlled in accordance with the present invention in a similar manner to VLANs, as will be understood by those skilled in the art.

In accordance with another aspect of the present invention, a control protocol 504a operating on virtual bridge 502a, illustratively the MST protocol (or MSTP herein), sends a control message 555 (e.g., a BPDU) on its virtual interface 510*a*. Specifically, each virtual bridge 502 is configured to operate in the control plane (FIG. 5B) as though it were a physical switch 202, and as though its virtual interface 510 were a physical port 210. As such, control messages may be generated in a manner consistent with conventional techniques understood by those skilled in the art. Upon sending the control message 555 (e.g., to a switch 202*b*, as indicated in FIG. 5B with solid boxes for messages 555), the message is physically transmitted on the physical port 210*a*, and replicated (e.g., reproduced and forwarded) to each other virtual interface 510 (i.e., each other virtual bridge 502) associated with the shared trunk (e.g., virtual interface 510*b* of virtual bridge 502*b*). Also, as control messages 555 are received on the physical port 210*a* (e.g., from switch 202*b*, as indicated in FIG. 5B with dashed boxes for messages 555), the control messages are replicated to each virtual interface 510 (i.e., each virtual bridge 502) associated with the shared trunk.

Illustratively, the replication of the control messages 555 may be performed by a virtual hub 540 of the shared trunk. In particular, the virtual hub 540 may be managed and controlled by switch 202*a*, for example, by virtual bridge entity 308. Alternatively, the virtual hub 540 may be embodied as a process within the individual port 210, in particular, within the line card (e.g., 402, 404, etc.) and/or supervisor card 406 corresponding to the particular port. Also, control message replication may be performed by either an exact copy reproduction of the original control message 555, or, as will be understood by those skilled in the art, by creation of an appropriately modified control message 555, such as with modified headers, etc., appropriate for proper forwarding and distribution to the virtual interfaces 510 and/or physical port 210.

By replicating the control messages 555, the present invention allows virtual bridges 502 to share control message information, thus allowing each virtual bridge to act as through it were a physical switch with a physical port (e.g., of a shared segment). Otherwise, control messages sent from one virtual bridge 502*a* onto the shared trunk is (physical port 210*a*) would not be received by a second virtual bridge 502*b* of the shared trunk. As such, the second virtual bridge would remain unaware of control messages from the first virtual bridge, and unable to learn the appropriate information, as will be understood by those skilled in the art. In addition, if control messages received on the physical port were not replicated, one virtual bridge may receive the externally generated control message 555, while the other virtual bridges may not. Replicating the control messages in accordance with the present invention, therefore, allows multiple virtual bridges to share a single physical network port.

Notably, as described herein (e.g., particularly with reference to FIGS. 5A and 5B), the virtual interfaces 510 of the present invention are viewed only by other control protocols (e.g., control protocols 504 of other virtual bridges and/or protocol entities 304 of switches 202) as a shared link (i.e., the control plane). As such, the replication (e.g., in software) of traffic, for example, by a virtual hub 540, is only necessary for control messages 555. Data traffic (565 in FIG. 5A), on the other hand, remains switched in a conventional manner (e.g., hardware/logic-based) in the data plane, which views only the physical ports 210 to a switch 202. Particularly, the physical ports receive the data traffic and switch/forward the traffic based on various fields of the traffic (e.g., VLAN IDs, destination address, etc.), regardless of the virtual bridge arrangements. Because of the limited replication of traffic, and also due to the conventional rate limiting of control message traffic among switches/bridges, the present invention is scalable for large networks, as will be appreciated by those skilled in the art.

In sum, the present invention "fakes" physical ports for control protocols of the virtual bridges 502 on the shared trunk (port 210*a*), and creates a virtual hub to combine/manage the messages sent from the control protocols 504 (e.g., MSTP instances) operating on the virtual bridges. Accordingly, the single physical port (the shared trunk) may then be seen as (i.e., emulates) a shared segment (in accordance with 802.1Q), and the virtual bridges 502 may coincide on a single port, and the shared trunk will thus interoperate with bridges/switches that do not support virtual bridges and/or multiple virtual bridges on a single physical port. The present invention thus allows for the mixing of VLANs (and bridge domains) belonging to different virtual bridges to utilize the same port. Again, the physical (data plane) representation in FIG. 5A demonstrates the single port/interface 210*a* from the switch 202*a*, while the virtual (control plane) representation in FIG. 5B shows that the virtual bridges 502 are configured to act as separate switches (bridges) 502 with separate ports/interfaces 510 connected via a (virtual) hub 540, accordingly.

Figure 6:
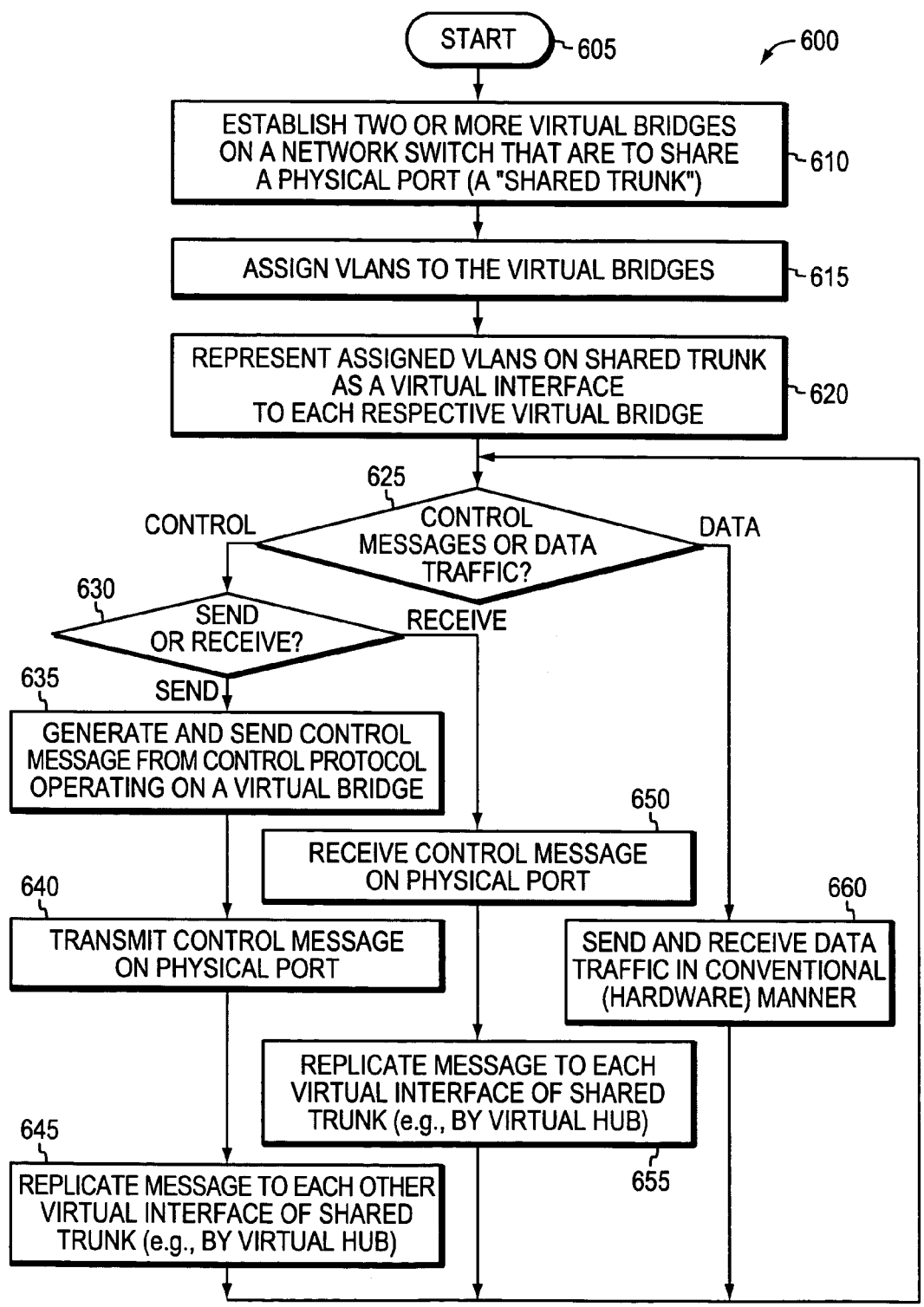
FIG. 6 is a flowchart illustrating a procedure for sharing a physical port among a plurality of virtual bridges on a switch in accordance with the present invention.

FIG. 6 is a flowchart illustrating a procedure for sharing a physical port among a plurality of virtual bridges on a switch in accordance with the present invention. The procedure 600 starts at step 605, and continues to step 610, where two or more virtual bridges 502 (e.g., 502*a* and 502*b*) are established on a network switch 202 (e.g., 202*a*) that are to share a physical port 210*a* (P0, a shared trunk). In step 615, VLANs are assigned to the virtual bridges as mentioned above, and in step 620, the assigned VLANs on the shared trunk are represented as a virtual interface 510 to each respective virtual bridge (e.g., 510*a* for 502*a* and 510*b* for 502*b*). Once the virtual bridges and interfaces are established, traffic to/from the virtual bridges may be divided into control messages 555 (e.g., BPDUs) or data traffic in step 625.

In the event the traffic at step 625 is a control message, when sending the control message (step 630), a control protocol 504 (e.g., an MST instance) operating on a sending virtual bridge (e.g., 502*a*) may generate and send the control message 555 on its virtual interface (e.g., 510*a*) in step 635. The sent control message 555 is then transmitted on the physical port 210*a* in step 640, and replicated (e.g., by a virtual hub 540) to each other virtual interface of the shared trunk (e.g., 510*b*) in step 645. Conversely, when receiving a control message (step 630), the physical port 210*a* receives the control message 555 in step 650, and the received control message is replicated (e.g., by virtual hub 540) to each virtual interface 510 of the shared trunk (e.g., 510*a* and 510*b*). Lastly, if at step 625 the traffic is data traffic, the data traffic may be sent and received in a conventional manner (e.g., hardware based) in step 660.

Advantageously, the novel technique shares a physical port among a plurality of virtual bridges on a switch in a computer network. By configuring the virtual interfaces on the virtual bridges, the novel technique allows multiple virtual bridges to utilize a single physical port, particularly for use with MSTP. In particular, the novel technique may be used with standard 802.1Q network configurations (i.e., non-proprietary configurations) because of the emulation of a "shared segment" by the novel shared trunk. Also, the novel technique is scalable to large computer networks, as the replication (e.g., software) may be necessary only for control messages, while data traffic may remain switched conventionally (e.g., hardware) over the physical port.

While there has been shown and described an illustrative embodiment that shares a physical port among a plurality of virtual bridges on a switch in a computer network, it is to be understood that various other adaptations and modifications may be made within the spirit and scope of the present invention. For example, the invention has been shown and described herein for use with 802.1Q and 802.1D compliant network devices, particularly, to those with the 4K VLAN limitation as described above. However, the invention in its broader sense is not so limited, and may, in fact, be used with other appropriate network devices, such as, e.g., those not limited to the 4K VLAN limitation, as will be understood by those skilled in the art. Also, while the above description describes utilizing the MST protocol and BPDUS, those skilled in the art will understand that other control protocols and messages may be used, such as, e.g., various registrations protocols (for example, the Generic VLAN Registration Protocol, "GVRP") and other control messages (for example, proprietary messages), etc.

It should further be noted that various proprietary mechanisms may be used to allow VLANs from several virtual bridges to be mixed on a single physical port. For example, the Per-VLAN Spanning Tree (PVST) and Rapid-PVST Protocols, available from Cisco Systems, Inc., establish one instance of the protocol per VLAN. In this manner, the protocol instances are configured to operate conventionally over a single port, and separate virtual interfaces and control messages replication by a virtual hub 540 may not be required. To comply with current standards (e.g., 802.1Q and 802.1D), however, it may be desirable to use non-proprietary protocols, such as the MST Protocol as described herein. (In addition, MSTP may be preferred to various proprietary protocols, as it may be less resource intensive for larger numbers of VLANs, and/or for other reasons as will be understood by those skilled in the art.)

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A switch for use with sharing a port among a plurality of virtual bridges in a computer network, the switch comprising:
   a plurality of physical network ports, at least one of which being a shared physical network port;
   two or more virtual bridges, each virtual bridge having a virtual interface corresponding to the shared physical network port, each virtual bridge operable to transmit and receive control messages over the virtual interfaces as though they were physical ports; and
   a virtual hub of the shared physical network port coupled to the virtual interfaces of each of the two or more virtual bridges, the virtual hub operable to i) send control messages received over one virtual interface to the shared physical network port and to each other virtual interface of the shared physical network port, and ii) send control messages received over the shared physical network port to each virtual interface of the shared physical network port.

2. The switch as in claim 1, further comprising:
   a processor coupled to the shared physical network port and operable to execute software processes; and
   a memory operable to store virtual bridge processes executable by the processor to operate as the two or more virtual bridges.

3. The switch as in claim 1, further comprising:
   a processor coupled to the shared physical network port and operable to execute software processes; and
   a memory operable to store a virtual hub process executable by the processor to operate as the virtual hub.

4. The switch as in claim 1, further comprising:
   hardware logic operable to switch data traffic over the shared physical network port.

5. The switch as in claim 1, wherein the virtual hub is further operable to replicate the control messages in order to send the received control messages to the shared physical network port and to each virtual interface of the shared physcial network port.

6. The switch as in claim 1, wherein the control messages are Bridge Protocol Data Units (BPDUs).

7. The switch as in claim 1, further comprising:
   a control protocol operable to send and receive control messages.

8. The switch as in claim 7, wherein the control protocol is a Multiple Spanning Tree (MST) Protocol.

9. The switch as in claim 7, further comprising:
   a control protocol instance for each virtual bridge.

10. The switch as in claim 1, wherein each virtual bridge is assigned respective sets of Virtual Local Area Networks (VLANs) for the corresponding virtual interfaces.

11. The switch as in claim 10, wherein a total number of assigned VLANs for all virtual interfaces of the shared physical network port is no greater than 4096.

12. The switch as in claim 10, wherein the virtual bridges are operable to control a state of their respective assigned VLAN set.

13. The switch as in claim 10, wherein each particular virtual interface is operable to allow traffic only corresponding to VLANs assigned to the particular virtual interface.

14. A method for sharing a physical network port among a plurality of virtual bridges at a switch in a computer network, the method comprising:
   establishing two or more virtual bridges, each virtual bridge having a virtual interface corresponding to the shared physical network port, the shared physical network port being one of a plurality of physical network ports at the switch;
   transmitting a control message from one or the virtual bridges over the respective virtual interface;
   sending the transmitted control messages to the shared physical network port and to each other virtual interface of the shared physical network port;
   receiving a control message on the shared physical network port; and
   sending the received control message to each virtual interface of the shared physical network port.

15. The method as in claim 14, further comprising:
   switching data traffic over the shared physical network port with hardware logic.

16. The method as in claim 14, further comprising:
   sending and receiving control messages with a control protocol, wherein the control protocol is a Multiple Spanning Tree (MST) Protocol.

17. An apparatus for sharing a physical network port among a plurality of virtual bridges in a computer network, the apparatus comprising:
- means for establishing two or more virtual bridges, each virtual bridge having a virtual interface corresponding to the shared physical network port, the shared physical network port being one of a plurality of physical network ports at the switch;
- means for transmitting a control message from one or the virtual bridges over the respective virtual interface;
- means for sending the transmitted control messages to the shared physical network port and to each other virtual interface of the shared physical network port;
- means for receiving a control message on the shared physical network port; and
- means for sending the received control message to each virtual interface of the shared physical network port.

18. The apparatus as in claim 17, further comprising:
means for switching data traffic over the shared physical network port.

19. The apparatus as in claim 17, further comprising:
means for sending and receiving control messages with a control protocol, wherein the control protocol is a Multiple Spanning Tree (MST) Protocol.

* * * * *

UNITED STATES PATENT AND TRADEMARK OFFICE
CERTIFICATE OF CORRECTION

PATENT NO. : 7,639,699 B2  Page 1 of 1
APPLICATION NO. : 11/499556
DATED : December 29, 2009
INVENTOR(S) : Francois Edouard Tallet It is certified that error appears in the above-identified patent and that said Letters Patent is hereby corrected as shown below:

Col. 9, Line 47, please amend as shown:

with the present invention[[ is]] include, but are not limited to, the

Col. 11, Line 40, please amend as shown:

bridge 502a onto the shared trunk[[ is]] (physical port 210a)

Col. 13, Line 12, please amend as shown:

desribes utilizing the MST protocol and[[ BPDUS]] BPDUs, those

Col. 14, Line 22, please amend as shown:

[[scial]]sical network port.

Signed and Sealed this

Ninth Day of November, 2010

David J. Kappos
*Director of the United States Patent and Trademark Office*